United States Patent [19]
Segal et al.

[11] 3,920,879
[45] Nov. 18, 1975

[54] GLASS FIBER FILLED POLYAMIDE COMPOSITES

[75] Inventors: Leon Segal; Hendrikus J. Oswald, both of Morristown, N.J.

[73] Assignee: Allied Chemical Corporation, New York, N.Y.

[22] Filed: June 4, 1973

[21] Appl. No.: 367,084

Related U.S. Application Data

[62] Division of Ser. No. 194,469, Nov. 1, 1971, abandoned.

[52] U.S. Cl. .............. 428/474; 156/222; 156/306; 428/288
[51] Int. Cl.² ........................................ B32B 27/34
[58] Field of Search ............ 161/197, 227, 170, 93, 161/DIG. 4; 260/37 N, 42.18; 117/138.8 N; 156/222, 306

[56] References Cited
UNITED STATES PATENTS

| | | | |
|---|---|---|---|
| 2,778,764 | 1/1957 | Morrison | 161/197 X |
| 2,943,011 | 6/1960 | Rayner | 161/197 X |
| 3,372,137 | 3/1968 | Tierney | 260/37 N |
| 3,447,999 | 6/1969 | Rogier et al. | 161/197 |
| 3,485,805 | 12/1969 | Cowell et al. | 161/227 X |
| 3,493,544 | 2/1970 | Goodman et al. | 161/227 X |
| 3,654,219 | 4/1972 | Boyer et al. | 260/37 N |
| 3,661,837 | 5/1972 | Cadus et al. | 260/37 N |
| 3,663,495 | 5/1972 | Michael et al. | 260/37 N |
| 3,762,986 | 10/1973 | Bhuta et al. | 161/227 |
| 3,765,998 | 10/1973 | Oswald et al. | 161/93 X |
| 3,798,115 | 3/1974 | Hofmann et al. | 161/227 |
| 3,833,453 | 9/1974 | Segal | 161/93 X |
| 3,834,980 | 10/1974 | Hall | 161/170 X |

*Primary Examiner*—William J. Van Balen
*Attorney, Agent, or Firm*—Roger H. Criss; Arthur J. Plantamura

[57] ABSTRACT

Long glass fiber reinforcement allows the use of extremely low molecular weight polymer in a composite which is formable in a mold held at ambient temperatures by preheating the composite sheet outside of the mold. The glass-reinforced, low molecular weight polyamide, per se, may be formed in a conventional metal stamping mold and exhibits excellent performance and good surface properties.

7 Claims, 1 Drawing Figure

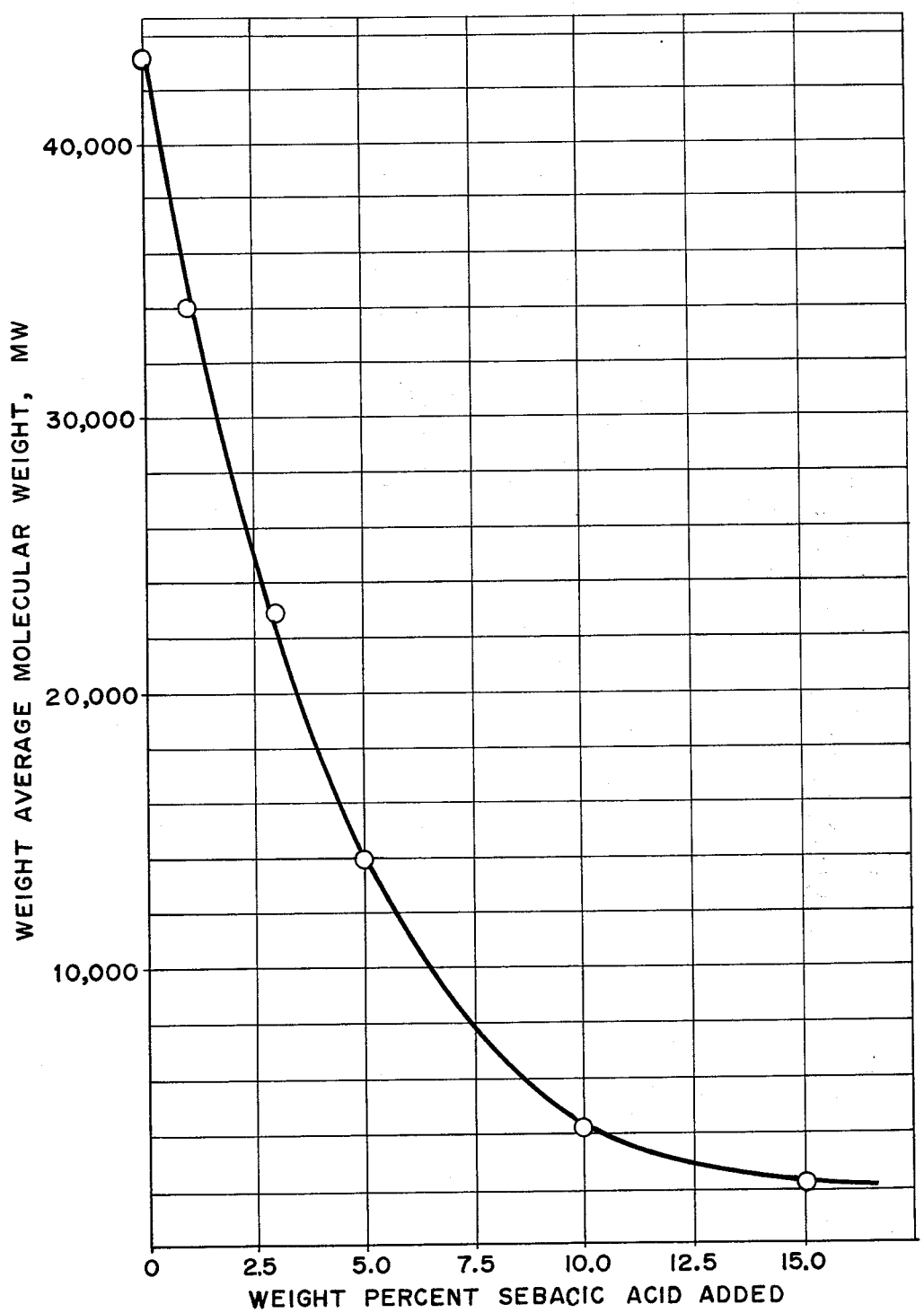

GLASS FIBER FILLED POLYAMIDE COMPOSITES

This is a division of application Ser. No. 194,469, filed Nov. 1, 1971, and now abandoned.

BACKGROUND OF THE INVENTION

This invention relates to shaped thermoplastic articles. More particularly, this invention relates to a composite sheet consisting essentially of relatively low molecular weight polyamides, e.g., polymers of nylon 6 ($\epsilon$-polycaprolactam), which are reinforced with long glass fibers with or without additional particulate filler. It is highly advantageous to have a sheet of low cost that can be shaped into items of desired geometry in a shaping apparatus which need not be heated, but rather can be employed at ambient temperature.

It is known that many thermoplastic polymers can be formed at ambient temperatures by means of various sheet metal-forming techniques such as deep drawing, stretch forming, stamping, etc. These cold sheet-forming processes are economically very attractive because it is possible to achieve rapid production rates, e.g., at rates that exceed one item a second or even faster. Unfortunately, the products prepared by prior art techniques exhibit deficiencies in their properties, namely, low heat distortion temperature, poor dimensional stability under load, tendency for stress cracking, low modulus and strength, etc. Consequently, the potential for a broad range of end-use applications heretofore has been severely limited.

Many attempts have been made to overcome these problems by altering the process or the construction of the sheets without affecting essentially the rate of production (or the residence time in the mold). For example, it is known that one can improve the heat distortion temperature, impact resistance, and over-all performance of the shaped item in a process where preheated glass-reinforced thermoplastic sheets are shaped in a cold mold. This technique has not heretofore been considered applicable except to such amorphous polymers as polyvinyl chloride and styrene-acrylonitrile copolymer and solely to crystalline polymers having a very high molecular weight, i.e., high melt viscosity, such as polypropylene.

All these polymers exhibit a unique high melt viscosity at their softening point and will not flow under their own weight. When external pressure is exercised, their specific values of the melt viscosity at their softening points are as follows: polyvinyl chloride $10^{13}$ poise at 87°C and $3 \times 10^5$ poise at 150°C; styrene acrylonitrile copolymer $10^{13}$ poise at 100°C and $2 \times 10^5$ poise at 200°C; polypropylene $2 \times 10^6$ poise at 175°C and $7 \times 10^5$ poise at 200°C. These are representative values for commercial grades of the polymers listed. It is this unique high melt viscosity which permits transfer to the cold-forming press of the reinforced polymeric sheets without losing coherency.

The reinforcement of synthetic polymeric materials with glass fibers is also know. Articles prepared from such glass-filled polymers find varied uses which take advantage of the high strength-to-weight ratio that results from the synergistic combination of glass fiber and plastic. To obtain the fullest advantage of the resin-fiber composite, it is necessary to optimize the adhesion energy density at the resin-fiber interface. The most direct method of optimizing this adhesion energy density is by maximizing the adhesion of liquid resin to the solid fibers and thereby simultaneously minimizing the void content at the interface. Fiber-resin adhesion can be maximized and void content minimized by decreasing the surface tension of the liquid resin or by maintaining a minimum interfacial contact angle.

The problem of low surface tension resin in the past has generally been circumvented through the use of glass sizings or coupling agents. These coupling agents are chemically bi-functional and form a chemical bond bridge between the glass fiber surface and the resin matrix. While such coupling agents are important in glass fiber-resin composite systems, the problem of interfacial wetting or adhesion is nevertheless critical. It has been contended that true intimate molecular contact of the two phases without surface chemical reactions is sufficient to produce an effectively bonded composite. However, such complete interphase bonding is not actually obtainable and, hence, chemical bonding is in fact significant.

Complete surface wetting is also important in limiting the number of detrimental microvoids inherent in all glass-resin systems. Microscopic evaluations, for example, have shown as many as $10^7$ to $10^9$ microvoids per cubic inch of commercial resin which is equivalent to 3% to 5% by volume of such products. Voids and occlusions are regions of stress concentration and encourage the initiation and propagation of microcracks and so cause failure by separation at the fiber-resin boundary. Void formation along the fiber surface is increased as the contact angle or surface tension of the resin is increased. In terms of the parameters usually associated with polymeric materials, it has been shown that the surface tension of a molten polymer increases as the melt viscosity increases. For pure polymers, surface tension therefore increases as the molecular weight increases. Such behavior can of course be predicted by the fundamental principles of physical chemistry, and experiments have shown that the number and size of voids is reduced significantly as the surface tension or viscosity of the resin phase is decreased.

In practice, however, it has heretofore not been practical to decrease the molecular weight below certain high values since mechanical properties deteriorate as the molecular weight is decreased. Especially for engineering or structural applications, where properties such as high flexural strength, impact resistance, high temperature strength, and low creep are important, polymers of extremely high molecular weight are most often desirable.

SUMMARY OF THE INVENTION

According to the present invention, the lower surface tension of low molecular weight polymers of the polyamide type are used to advantage to form reinforced composites suitable for structural and engineering applications. Utilization of such low molecular weight polymers is also very beneficial for economic reasons since such materials can often be produced at lower cost than extremely high molecular weight polymers. In addition, degraded scrap material not otherwise useable in such applications may be utilized and this adds to the advantageous economies. The composite materials described herein have mechanical properties equal to or greater than the mechanical properties of extremely high molecular weight, glass fiber-reinforced composites but utilize instead in combination with glass fiber low molecular weight low surface tension polyamide resins.

In accordance with the invention, it has been found that an alternate method of obtaining the objective of increased efficiency and strength of fiber-reinforced composites, i.e., decreasing the surface tension of the fluid resin phase, is to increase the length of the glass fiber reinforcement incorporated in the polymer. The effectiveness of this approach has been verified both experimentally and theoretically. An analysis of the tensile behavior of fibrous reinforced composites can be used to show that theoretically the maximum strength would be obtained with fibers of infinite length, e.g., continuous filament composites. For fibers of shorter length, there is a certain "ineffective length" at each end of the fiber over which the fiber is stressed at less than the maximum fiber stress. Such an ineffective length is a physical necessity since the fiber stress must decrease from the maximum at or near the center of a long fiber to zero at the very end. Thus, long fibers are more efficient load-bearing agents than shorter fibers since an ineffective length would be a smaller percentage of the total reinforcement length. Tests have demonstrated that for a glass fiber-epoxy system in which fibers less than one-half inch in length are used, the fibers in processing are actually pulled out of the resin matrix thus resulting in a substantial lowering of ultimate strength. For such systems it has been demonstrated that, while continuous filament composites are the most effective in their load bearing characteristics, fibers of length 2 to 5 inches or longer have over 90% of the efficiency of such continuous fiber composites; fibers of ½ inch length possess approximately 60% of the continuous fiber composite strength while fibers one-fourth inch long give composites that possess less than 40% of the continuous fiber composite strength. It is evident that an analogous relationship applies for other glass-reinforced resin systems.

Although in theory the improved mechanical behavior of compositions incorporating relatively long glass fiber would seem to be apparent, it has not been employed in practice because the use of long fibers is not generally compatible with conventional production techniques, i.e., injection molding or extrusion, which are not suitable for processing extremely long fiber-reinforced materials. Hence, the fibrous reinforcement used with such processing techniques through necessity have short fibers, e.g., of lengths one-eighth inch to one-fourth inch or shorter. The use of much longer fibers in injection molding machines or extruders would result in fiber break-up to very short lengths and is therefore not feasible for mechanical reasons, although desirable for strength properties. The invention describes a process wherein glass fiber reinforcement of extremely long length, i.e., 2 inches or longer, can reinforce the low molecular weight resins described earlier and be processable by an extremely rapid processing technique.

It is an integral part of this invention that the fibrous reinforcement be present in lengths of 2 inches or longer in order to compensate for the lower mechanical properties and cohesive strength of the low molecular weight polyamide resins and in order to form a coherent reinforcing structure during the pre-heat stage of our processing method.

One of the unique features of the invention resides in the utilization of low molecular weight polyamide resins which heretofore have not been employed to form usable objects by any standard thermoplastic processing method. In the past, such resins have been used only as adhesives, sealants, coatings, and the like, in which their low melt viscosities and therefore low surface tensions were utilized advantageously. In this invention, polyamides with their low molecular weights or low melt viscosities, or equivalently, low surface tensions, are used to obtain highly effective polymer-fiber interaction. Also, because of low viscosity, these polymers have better wetting and lower void contents in the finished product. The rapid processing technique permissible with these polyamides is employed to shape these thermoplastic composites without fiber break-up, and it is an integral part of the advantages of the present invention since utilization of the materials described herein are dependent upon and inseparable from this processing method.

In accordance with the invention, a method is provided that allows the use of high melting, low molecular weight, semicrystalline polymers of the polyamide type which have excellent high temperature properties in a cold mold-stamping operation. The invention permits the use of polymer which is below standard commercial molding or fiber grade or the use of commercial grade whose viscosity has been reduced to polymers which have a low viscosity or high fluidity at a temperature slightly higher (10°C) than their melting or softening point. For example, the viscosity of fiber grade polycaprolactam is approximately $1.8 \times 10^3$ poise at 240°C. The polyamide resin would ordinarily drip away from the aformentioned glass reinforcement and the reinforced sheet would sag and lose all its coherency during the external preheating stage before it could be inserted in the press for stamping in a cold mold into a shaped article. In accordance with the invention, the coherency of the preheated sheet can be retained by using a nonwoven fibrous phase, e.g., nonwoven mat, woven cloth, intertwined fibers, or agglomerated long glass fibers held together by adhesive resinous binders or mechanically bound by stitching. This is in contrast to short chopped fiber reinforcement which possesses no integral coherent structural strength. The polyamide resin, when heated over its softening point, is retained by surface tension between interstices of the reinforcing woven or nonwoven mat and by capillary action between the fibers comprising the glass strands.

Such effective polymer-fiber interaction is obtained because of the extremely low melt viscosities of the low molecular weight polyamide resins. For example, a polycaprolactam of molecular weight 7000 has a low shear (i.e., maximum) melt viscosity of 200 poise at 250°C and 80 poise at 275°C. It is thus seen that this invention allows the use of this extremely low molecular weight resin, even though its melt viscosity is well below that of the fiber-grade resin. In addition to the improved wetting and interphase adhesion achieved by using polyamides of low molecular weight, the low molecular weight of the polyamide leads to both higher crystallization rates and higher levels of ultimate crystallinity, which are desirable characteristics of this invention, as early development of crystallinity results in a greater initial stiffness which reduces the necessary residence time in the shaping press.

While the desirable features of low molecular weight polyamide resins are to be expected, such polymers have previously never been employed to form high strength moldings because of the inherent shortcomings and undesirable features of such polymers such as extremely high melt fluidity and decreased strength of the solidified polymer. It is a specific object of this invention to utilize polymers of this kind in combination with the coherent fibrous reinforcement described above to form a composite material that exhibits all of the desirable features of the low molecular weight resins, e.g., shapable in a mold which is not heated, but in which the undesirable features are taken advantage of in order to achieve physical properties, e.g., relatively higher strengths, heretofore obtainable with relatively high molecular weight resins only. The exploitations of the material deficiencies, as well as the material advantages, is possible because of the nature of the forming process, which is an integral part of this invention.

An alternate method utilizing the aforementioned composite consists of forming a laminate structure in which at least one of the layers consists of unfilled or inorganic mineral-filled polyamide sheet or of polymers other than polyamides which may be adhesively bonded to the fiber filled substrate.

DESCRIPTION OF THE DRAWING

In the accompanying drawing, the plotted data illustrate by way of example one method of reducing the molecular weight of commercial fiber-grade polyamide to the preferred levels of this invention. Specifically, the addition of sebacic acid to high molecular weight $\epsilon$-polycaprolactam to effect the reduction of molecular weight upon melt blending is shown graphically.

DESCRIPTION OF THE PREFERRED EMBODIMENTS

The glass fiber-filled thermoplastic sheets of the invention are prepared from semicrystalline thermoplastic polyamide polymers. Items produced from these glass-reinforced or glass fiber- and filler-reinforced polyamides demonstrate excellent characteristics at elevated temperatures permitting the use thereof for a variety of structural and engineering applications.

The term "polyamide" used in the practice of the present invention is intended to include long chain synthetic polymers which have regularly recurring amide groups as in integral part of the main polymer chain and, hence, include amide-ester copolymers. Suitable polyamides can be prepared by polymerization of difunctional monomer or equivalently its cyclized lactam (e.g., $\epsilon$-aminocaproic acid or caprolactam, respectively) or by reaction of a conjugate pair of monomers, for example, a diamine and a dicarboxylic acid (e.g., hexamethylene diamine and adipic acid).

Suitable polylactam can be produced by polymerization of lactam monomers of the formula

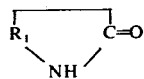

where $R_1$ is an alkylene group having from 3 to 12 or more carbon atoms, preferably from 5 to 12 carbon atoms. A preferred monomer is $\epsilon$-caprolactam having 5 carbon atoms in the alkylene group. Lactam monomers in addition to $\epsilon$-caprolactam include pyrolidone, piperidone, valerolactam, caprylactam, lauryl lactam, etc. Also included are copolymers of two or more of the above or similar lactam monomers. Suitable polyamines useful in polymerization of polyamides include propanediamine, hexamethylene diamine, octamethylene diamine, etc. Suitable polycarboxylic acids include acids such as adipic, pimelic, suberic, sebacic, dodecanechroic, etc. Also included are copolymers or polyblends of polyamides of the two above categories.

The polyamide used in the process of the invention, preferably polycaprolactam or nylon 6, may have a weight average molecular weight of 3,000 to 25,000. This is in contrast with polyamides normally used in fiber, film, and molding operations which have weight average molecular weights in the range of 30,000 to 50,000. Such low molecular weight polymers may be obtained by either limited polymerization of the above-mentioned lactams or polyamines and polycarboxylic acids or by any one of several controlled degradative operations performed upon higher molecular weight polymers or by mechanodegradation. Limited polymerization may be achieved by controlling the reaction conditions such as time, temperature or monomer ratios. Controlled degradation may be achieved by reacting a high molecular weight polyamide with water (e.g., hydrolytic degradation) or by reacting a high molecular weight polyamide with an excess of diamine or dicarboxylic acid. These techniques are well known to those skilled in the art.

In the graph of the accompanying drawing, the reduction in molecular weight is achieved by adding sebacic acid to a high molecular weight polycaprolactam (although other polyamides may be substituted) or original weight average molecular weight 43,000. The controlled lowering of molecular weight may be achieved by melt blending the original polymer with the dibasic acid in an extruder. The use of other dicarboxylic acids gives qualitatively similar reductions in molecular weight. The exact method by which the low molecular weight polyamides are produced has no appreciable effect on the use of the polymer in accordance with the invention. By reference to the accompanying figure, it is seen that the addition of 2.5 g. of sebacic acid to 100 g. of $\epsilon$-caprolactam of weight average molecular weight 43,000, followed by melt blending (i.e., reaction) will result in a polyamide of molecular weight 24,000, or 55.8% of the original. The addition of 5.0 g. of sebacic acid to 100 g. of the original $\epsilon$-caprolactam results in a product of molecular weight 14,000. The rate of molecular weight reduction is substantially reduced upon the addition of more than about 15% sebacic acid. This figure will be referred to again in the examples.

In normal usages the degradation (i.e., lowering of molecular weight) that may occur during normal nylon 6 film or fiber-forming operations is considered highly detrimental to the finished product. In nylon 6, as with other polymers in general, it is usually expected that a number of mechanical properties, including flexural life, tensile strength and tensile elongation, and impact strength, decrease as the molecular weight of the polymer decreases. With nylon 6 in particular, the lowering of the weight average molecular weight below 20,000 to 25,000 has heretofore resulted in polymers which are not formable into useful objects because of their extreme brittleness (low strength) and high fluidity (difficulty in processing). In connection with the invention, however, even lower molecular weight nylon 6 than that heretofore considered useful may be used in combination with the reinforcing fiber phase as described herein to produce molded or shaped articles of high strength and other advantageous physical properties. Furthermore, the extremely low viscosity of such polymers allows thorough impregnation of the glass fiber strands by the molten polymer and results in the enhanced properties of the composite. Significantly, the resultant product does not contain, to any noticeable degree, the large number of entrapped microvoids that are inherent in the fabrication of composite produced by the impregnation of fibrous reinforcements by viscous, high molecular weight resins. The elimination of such voids is recognized as a major factor in improving the properties of fiber-reinforced composites.

Another advantage of using low molecular weight polymer in combination with long fiber reinforcement is that the rapid rate of crystallization and the high degree of attained crystallinity results in a product with many desirable properties. Among the properties of such crystalline polymers is excellent solvent resistance at elevated temperatures, improved stiffness, and excellent impact resistance at all temperatures. Such property improvements would not be expected with similar materials reinforced with short fibers or with noncrystalline long fiber-reinforced composites. Furthermore, as demonstrated, the low viscosity of such low molecular weight polymers would not ordinarily allow fabrication into shaped articles by the process of this invention unless the polymer compositions are first stabilized with long fiber reinforcement to lend support as described herein.

The proportion of polymer in the composition may vary within fairly broad limits. Generally, however, percentages by weight based upon the total composition of from about 30% to 80%, and preferably 35% to 75%, are employed.

The term "glass fibers" as used herein is intended to be employed in a broad sense to include glass cloth, as well as individual, continuous fibers, more particularly known as filaments, which have a length greater than 1 inch and preferably between about 1.25 and about 3.0 inches; groups of twisted strands, more particularly known as yarn or thread; untwisted or slightly twisted groups of strands generally looped back on one another, more particularly known as roving; discontinuous lengths of fibers, more particularly known as staple fibers, which can be spun into threads, twisted strands, slivers, roving or yarn.

In addition, mechanically bound, discontinuous nonwoven glass roving, yarn or strands may be employed. The method of mechanical binding may be by "needling," i.e., stitching with glass, or by depositing the long glass fibers, in such a manner as to form an entangled, stable mat. It is assumed that all the glass, or other fibrous reinforcement, used in conjunction with the polyamide has gone through the usual sizing or pretreatment operations as is known to those skilled in the art.

Compositions of matter comprising sheets of polycaprolactam as the matrix and glass fiber and/or glass fiber, graphite fibers or glass fiber and graphite fiber combinations with asbestos or other mineral filler have good properties. The quantity of of fiber reinforcement in the compositions may vary within a broad range, i.e., generally from about 75% to 10% and preferably from 60% to 15% based upon the weight of the total composition.

Filler materials in amounts from 1% up to about 50% and preferably from about 10% to 40% may be usefully employed herein in conjunction with the glass-reinforced amide polymers; such fillers may be selected from a wide variety of minerals, metals, metal oxides, siliceous materials including short (i.e., one-half inch or shorter) glass fibers, metal salts, and mixtures thereof. These fillers may optionally be treated with various coupling agents or adhesion promoters, as is known to those skilled in the art. Advantageous physical properties are achieved if the filler material has a Young's modulus of $10^7$ psi or greater and at least a Young's modulus twice as great as that of the polyamide. Examples of fillers included in these categories are alumina, aluminum hydrates, feldspar, asbestos, calcium carbonates, carbon black, quartz, and other forms of silica, kaolinate, bentonite, garnet, saponite, beidellite, calcium oxide, calcium hydroxide, etc.

The fillers listed above are given as examples only and are not meant to limit the scope of fillers that can be utilized in this invention. It should also be evident that the same mechanism which allows for highly effective resin-fiber interfacial interaction, i.e., that resulting from the low melt viscosities and surface tensions of low molecular weight polymers, will also result in improved polymer-filler interaction and hence increased adhesion between these two dissimilar phases. Adhesion promoting agents or coupling agents may, of course, also be utilized on both the fibrous and the particulate filler phases.

All systems utilizing low molecular weight polyamides as the matrix resins, which are the subject of this invention, are found to exhibit excellent properties such as greater impact and flexural strengths and substantialy higher heat distortion temperature which cannot be obtained by reinforced low molecular weight thermoplastic composites heretofore known in the prior art.

For engineering, structural and heavy-duty mechanical applications, the strength properties of particular importance are flexural and tensile strengths and modulus, and impact resistance. For many applications, it is necessary that not only one of these properties be improved but that a combination of properties be improved. For the applications mentioned above, where end-uses such as building panels, automobile components and equipment housings are to be considered, one suitable screening parameter is the strength index. Generally, the higher the strength index of a composition the more valuable it is for several of the uses mentioned above.

Strength index is the product of the notched Izod impact strength and the square if the flexural strength. It will be referred to herein by the notation $S^2I$ and has units of $ft\text{-}lbs^3 in^{-5}$. The reinforced high molecular weight polyamides such as polycaprolactam are characterized by $S^2I$ values of at least $30\text{--}40 \times 10^6$ $ft\text{-}lb^3 in^{-5}$ and by a flexural modulus of at least $2.5 \times 10^5$ psi. Preferable minimum levels for $S^2I$ and flexural modulus are $50 \times 10^6$ and $3 \times 10^5$, respectively. All strengths are measured according to ASTM requirements. For many preferred compositions described herein, values of $S^2I$ will be 2 to 4 times as great as those for compositions previously known to the art.

Various processing techniques may be employed in the preparation of the reinforced composite sheets of the present invention. Plastic sheets may be extruded separately and then placed into a number of alternating plastic sheet-glass mat layers, which are thoroughly fused under heat and pressure. Plastic powder or pellets may be dispersed into layers of nonwoven glass mat or loose glass fibers and fused under heat and pressure; or a continuous extrusion-lamination line or calendering system may be used to produce an endless composite sheet, which can be cut into suitable lengths.

Shaping of the sheet is accomplished by forming under pressure in a comparatively cold mold. Prior to shaping, the composite sheet is preheated outside of the mold to a temperature of about the softening point or higher. The preheated sheet is then rapidly transferred to the cold mold where the shaping pressure is applied. Retention in the mold is limited to relatively short duration, e.g., 1–30 sec. or until the shape cools sufficiently to allow its shape to be self-sustaining. The exact time in the mold is thus a function of part thickness, complexity, preheat temperature, mold temperature, and glass and/or filler content.

The following examples illustrate further this invention. The polycaprolactam described in the examples were tested in the "bone-dry" state, i.e., the samples were in equilibrium with an atmosphere of 0% relative humidity.

EXAMPLE 1

E-polycaprolactam of average molecular weight 4,500 was prepared by mixing ground, molding grade nylon 6 (10,000 g.) with sebacic acid (1000 g.). The weight average molecular weight of the original nylon 6 was determined as 43,000. After dry tumbling, this mixture was extruded in a standard 1-in. screw extruder and pelletized into ⅛ ×⅛ inch pellets. The weight average molecular weight of these pellets was determined by standard dilute solution viscometry techniques as 4500. The extruded pellets were thoroughly dried and then dispersed into layers of nonwoven glass mats constructed from discontinuous chopped fibers of 2 inches minimum length. Seven layers of glass mat are used to produce a ⅛inch-thick composite sheet whose weight ratio of polymer to glass is about 60/40. It is advantageous to distribute the polymer between the layers as uniformly as possible. Fusion of the sandwich assembly can be carried out in a compression mold in a dry nitrogen atmosphere at 255°C. The final step of fusion is carried out at 160 psi for 5 minutes. The sheets are cooled slowly in the process under pressure to develop crystallinity.

Shaping was accomplished in a deep-drawing press which had a triple action die-set to produce 5 inch-dia. cylindrical cups. The glass reinforced sheet was preheated to 250°C for 2 minutes in an infrared oven. The preheated sheet was stamped in a conventional manner with the die at room temperature (23°C) with the exception that the dwell time was 8 seconds to allow the shaped part to crystallize in the mold and to cool below 130°C before removing from the press. The stamping pressure was 100 psi. Physical properties were determined upon the part thus obtained by cutting test specimens from the shaped cup. The properties obtained are shown in Table I. All mechanical properties were obtained under standard ASTM test conditions.

From Table I it is seen that the mechanical properties are sufficiently superior to allow application of this composite in supporting structures, rigid paneling, etc. The impact strength and S²I are exceptionally high. Such a low molecular weight polyamide is not normally employed to form molded objects for the reason given earlier, and it can be assumed that these excellent properties are obtained because of the mode and efficiency of the reinforcing agent and forming process.

EXAMPLE 2 - COMPARATIVE

The effect of the long glass-fiber reinforcement upon the mechanical properties of reinforced polyamide was examined by blending the polyamide with ⅛ inch long glass fibers in an extruder. Nylon 6 of weight average molecular weight 43,000, as in Example 1, was used. Comparison of the composite of Example 1 with the standard, high molecular weight materials of this example were made to ascertain suitability for heavy-duty or load-bearing applications.

The nylon 6-glass fiber mixture was compression molded as in Example 1 into ⅛ inch thick sheets. Attempts to shape these sheets in the stamping press, as outlined in Example 1, were unsuccessful since the composite sheet reinforced with short glass fibers did not possess any integral stability and actually disintegrated during the preheat procedure. Transfer of such a heated sheet to the shaping press was not practical.

It was, therefore, necessary to perform mechanical tests upon these short fiber-reinforced sheets from samples cut from the initial compression-molded flat sheets. The results are presented in Table I. The excellent mechanical properties characteristic of such high molecular weight composite materials are evident. However, the tensile modulus, tensile elongation, impact strength, strength index, and heat deflection temperature of the composite of Example 1 are equal to or greater than those of Example 2. In particular, the impact strength and strength index of the material of Example 1 is considerably higher than that of Example 2. The low molecular weight resin composite, reinforced with long fiber reinforcement, and shaped by stamping the preheated sheet in a cold press, would thus be judged more than suitable for structural, or load-bearing, high impact applications in contrast to the knowledge hertofore known in the art.

TABLE I

|  | Ex. 1 | Ex. 2 |
| --- | --- | --- |
| Polymer Molecular Weight | 4,500 | 43,000 |
| Glass Content (Wt. %) | 40 | 40 |
| Tensile Strength (psi) | 17,200 | 30,000 |
| Tensile Modulus (psi × $10^{-6}$) | 0.96 | 1.0 |
| Ultimate Tensile Elongation (%) | 2.1 | 3.5 |
| Flexural Strength (psi) | 25,400 | 43,000 |
| Flexural Modulus (psi × $10^{-6}$) | 0.93 | 1.7 |
| Izod Impact Strength (ft-lb/in.notch) | 17.3 | 3.7 |
| S²I (ft-lb³/in⁵)× $10^{-6}$ | 11,200 | 6,850 |
| Heat Deflection Temperature at 264 psi | 215°C | 215°C |

EXAMPLE 3

E-caprolactam was polymerized in a closed reaction vessel in the usual manner known to those chemists skilled in the art. Polymerization was stopped after a relatively short residence time, and the weight average molecular weight of the polymer was determined by dilute solution viscometry techniques as approximately 4300. This polymer was washed and dried and used in the preparation of glass-reinforced composite sheets as described in Example 1. Mechanical properties for samples taken from objects shaped in the manner described in Example 1 are presented in Table II.

EXAMPLE 4 - COMPARATIVE

Short glass fiber-reinforced, high molecular weight nylon 6 sheet was prepared in the same manner as described in Example 2, except that the fiber reinforcement was only 20% by weight of the composite. The weight average molecular weight was again determined as 43,000. As in Example 2, these sheets could not be formed in the manner described in this invention because the sheet disintegrated in heating and could not be transferred to the mold. Hence, the test samples were again cut from the initial compression molded composite sheets. Mechanical properties are presented in Table II where they are compared to the low molecular weight, long fiber-reinforced material of this invention as described in Example 3.

The results presented in Table II are qualitatively similar to those presented in Table I. Certain properties of the material of Example 4 are higher than those of Example 3 while certain other mechanical properties of the material of Example 3 are higher. Of particular importance, it should be noted that the impact strength, strength index and heat deflection temperature of the material of Example 3, of molecular weight 4300, are significantly higher than the corresponding properties of Example 4. It can be seen from the results that overall the material of Example 3 is essentially adequate for applications where only higher molecular weight materials have been used previously.

TABLE II

|  | Ex. 3 | Ex. 4 |
|---|---|---|
| Polymer Molecular Weight | 4,300 | 43,000 |
| Glass Content (Wt. %) | 20 | 20 |
| Tensile Strength (psi) | 7,400 | 16,000 |
| Tensile Modulus (psi × $10^{-6}$) | 0.06 | 0.45 |
| Ultimate Tensile Elongation (%) | 1.33 | 3.5 |
| Flexural Strength (psi) | 17,100 | 27,000 |
| Flexural Modulus (psi × $10^{-6}$) | 0.49 | 0.9 |
| Izod Impact Strength (ft-lb/in notch) | 9.9 | 1.25 |
| $S^2I$ (ft-lb$^3$/in$^5$)× $10^{-6}$ | 2,900 | 914 |
| Heat Deflection Temperature at 264 psi | 215°C | 210°C |

EXAMPLE 5

Polycaprolactam of weight average molecular weight 16,000 was blended with short asbestos fibers, i.e., fibers whose length was no more than 40 times the diameter. 2500 Grams of asbestos was mixed with 7500 g. of the polyamide and melt blended in the extruder. 8000 Grams of this polymer-filler mixture was then combined with 2000 g. of 3 inch-long glass fibers in the manner described in Example 1 to form a composite sheet of composition by weight of 55/25/20-polyamide/asbestos/glass fiber, respectively.

This material was preheated and shaped in a cold mold in the manner described in Example 1. Mechanical properties of test samples of this material are presented in Table III.

TABLE III

|  | Ex. 5 |
|---|---|
| Polymer Molecular Weight | 16,000 |
| Composition (polyamide/asbestos/glass fiber) | 55/25/20 |
| Tensile Strength (psi) | 6,200 |
| Tensile Modulus (psi × $10^{-6}$) | 1.45 |
| Ultimate Elongation (%) | 0.46 |
| Flexural Strength (psi) | 16,900 |
| Flexural Modulus (psi × $10^{-6}$) | 1.06 |
| Izod Impact Strength (ft-lb/in notch) | 7.2 |
| $S^2I$ (ft-lb$^3$/in$^5$) × $10^{-6}$ | 2,030 |
| Heat Deflection Temperature at 264 psi | 218°C |

A comparison between the properties of the material of Example 5 and that of Example 3 can be made since both materials contain 20% long glass fiber reinforcement. Inspection of the data reveals the validity of this comparison as the properties of both materials are surprisingly similar. The main exceptions are the tensile and flexural moduli of the material of Example 5, which are higher than those of Example 3. This is evidently a result of the higher total filler-plus-fiber loading of the Example 5 material. This increase in moduli results in a brittleness which correspondingly decreases the impact resistance slightly from a value of 9.9 in Example 3 to 7.2 in Example 5.

EXAMPLE 6

A tri-layer laminated composite sheet was prepared by compression molding each of the three component layers as outlined in Example 1. The top and bottom layers, each 0.033 inch thick, was the asbestos-filled, long fiber-reinforced material of Example 5. The central core material was a standard high molecular weight nylon 6 of weight average molecular weight 29,000 without any filler and of thickness 0.034 inch. The three sheets were juxtaposed in the order mentioned and fused together at 255°C and 50 psi pressure between the platens of a compression molding press. This laminated composite was then preheated in an infrared oven to 260°C for 2 minutes, transferred to the cold-stamping press, and stamped into a 5 inch-dia., 2 inch-deep cyclindrical cup as described previously. This material could be thus shaped even without the long fiber reinforcement in the core section since this section was supported during the preheat stage by the reinforced exterior layers. Properties of this laminated sheet were comparable to the properties of the material of Example 5.

What is claimed is:

1. A high impact resin sheet formable into shaped objects wherein the shaped sheet is a laminate comprising:
   a. at least one layer of an amide polymer or copolymer resin at least 30% of which is an amide, said polymer or copolymer having recurring amide groups as an integral part of the main polymer chain and having a weight average molecular weight between about 3,000 and 25,000, said polymer or copolymer incorporating glass fiber having a length of at least about 1 inch fused to
   b. at least one layer of another thermoplastic long chain synthetic polymer resin.

2. The laminate sheet of claim 1 wherein the low molecular weight amide polymer (a) is nylon 6.

3. The laminate sheet of claim 1 wherein the low molecular weight amide polymer (a) is nylon 6,6.

4. The laminate sheet of chain 1 wherein the glass fiber is present in amounts of about 10 to about 75% by weight of the polymer of (a).

5. The laminate sheet of claim 1 wherein the polymer of layer (b) is a polyamide.

6. The laminate sheet of claim 1 wherein the low molecular weight amide polymer (a) has incoprorated therein filler in amounts of about 1 to about 50% by weight of the polymer of (a).

7. The laminate sheet of claim 5 wherein the polymer of layer (b) is nylon 6.

* * * * *